Feb. 6, 1923.
J. P. COLGAN.
AIR DISCHARGE VALVE.
FILED MAR. 16, 1920.
1,444,235.
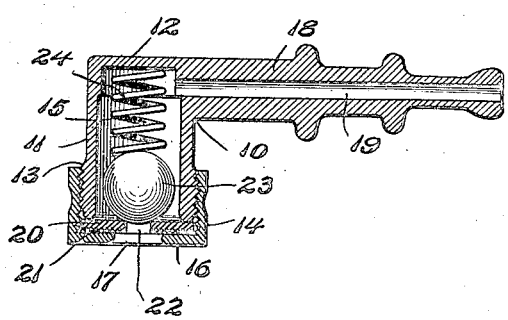
Inventor
John P. Colgan
By Foster, Freeman, Watson & Coit
Attorney Patented Feb. 6, 1923.

1,444,235

UNITED STATES PATENT OFFICE.

JOHN P. COLGAN, OF WAYCROSS, GEORGIA, ASSIGNOR OF ONE-FOURTH TO JAMES D. BLALOCK, OF WAYCROSS, GEORGIA, AND ONE-FOURTH TO JOHN N. STINSON, OF WAYCROSS, GEORGIA.

AIR-DISCHARGE VALVE.

Application filed March 16, 1920. Serial No. 366,317.

*To all whom it may concern:*

Be it known that I, JOHN P. COLGAN, a citizen of the United States, and residing at Waycross, in the county of Ware, State of Georgia, have invented certain new and useful Improvements in Air-Discharge Valves, of which the following is a specification.

This invention relates to means for automatically controlling the discharge of a fluid under pressure and is designed primarily for use on the ends of pipes or hose used to convey compressed air from a source of supply to inflate pneumatic tires. When the device is placed on the metal projecting portion of the valve or inlet of a tire, the compressed air is permitted automatically to discharge and enter the tire through its valve, the device making air tight connection with the top of the valve and the moment that the device is removed from the tire valve its air outlet is immediately and automatically closed. It is not possible to open the discharge valve of the device while air under pressure is supplied to it except by the pressure of some element such as the tire valve entering the discharge opening and thereby raising the discharge valve from its seat and the discharge opening immediately and automatically closes when such element is withdrawn. Its essential feature resides in a movable ball, preferably made of steel, in a valve chamber acted upon at all times by the air pressure tending to close it. It also includes as an important feature in its best form a removable washer around the inner face of which the ball strikes in closing the outlet. This washer furthermore extends partly over the outlet opening from the casing so as to present an outer surface around its central hole against which the tire valve may come. The washer is preferably made of an inner portion of rubber and outer layers of fabric or rubber impregnated fabric in order to give it sufficient strength and lasting qualities. In the form shown, the device is exceedingly simple in construction and can be made easily and cheaply and includes no mechanism or parts which can bind or which are likely to get out of order. There is no part which can wear or give out save the washer and that can be easily removed, even by unskilled workmen. Its ease of use and absolute certainty of effective operation constitute other advantages of the device. The novel features will be apparent from the following description and claim.

In the drawing, I have shown a longitudinal section through a device embodying the invention.

As shown in the drawing the device embodies a metal part 10 which has a cylindrical portion 11 closed at one end by the wall 12 and open at its other end and provided around its open end with screw threads 13. A metal cap 14 is provided with similar screw threads and fits over the open end of the cylindrical valve chamber 15 having the end wall 16 of flat, comparatively thin metal provided with a central opening 17 sufficiently large to receive the end of an ordinary tire valve. The housing or member 10 is provided with an integral projecting portion 18 adapted to receive the end of a hose for conveying compressed air and is provided with the air passageway 19 leading into the valve chamber 15 at its closed end. A washer of suitable resilient material is placed within the valve chamber 15 against the wall 16 of the cap 14 around the opening 17 and may be clamped by the cap 14 against the end of the cylinder 11. That washer is preferably made with its inner surface 20 composed of rubber and its outer surface 21 composed of fabric or fabric impregnated with rubber and the washer is provided with a central discharge opening 22 which registers with the opening 17 in the end of the valve chamber, but is of less diameter as shown. Within the chamber 15 a ball 23 is placed, preferably made of steel, and having a diameter slightly less than the diameter of the cylinder 11. It is movable longitudinally within the valve chamber 15 and is adapted to make contact with the washer face 20 around the opening 22 to close that opening. The space around the ball 23 within the valve chamber is sufficient to permit the compressed air entering through the passageway 19 to pass by it in the chamber and out through the washer opening 22 when the ball is raised from that opening, but the air pressure and its movement always tends to force the ball 23 to the outlet end of the valve chamber, closing the outlet 22. In using the device on a tire valve the valve stem passes through the opening 22 and raises the ball 23 from its seat, thus permitting the air under pressure to pass around it and out through the opening into the tire, but the moment the device is raised from the tire valve, the air pressure if sufficient immediately forces the ball back to its seat closing the outlet and this is true whether the device is held with the outlet opening up or down, since the pressure overbalances the weight of the ball.

As above indicated the air pressure ordinarily supplied at public stations for inflating tires will be sufficient in itself to hold the ball valve in my device in closed position at all times but in case the pressure falls until it is quite low the weight of the ball might in some positions so far overcome the tendency of the air to close it as to cause leakage and furthermore when the air supply tank is empty and the pump is started to raise the pressure the air may escape by the ball before the pressure reaches that stage necessary to close the valve and thus there may be difficulty in getting up the necessary pressure. To avoid or guard against these contingencies I place a small coiled spring 24 in chamber 15 bearing on ball 23 and tending to force it to its seat and close the outlet. The strength of this spring may be only sufficient to support the weight of the ball and hold it to its seat.

Having described my invention what I claim as new and desire to secure by Letters Patent is:

In a device of the class described, the combination with a metal member having a portion cylindrical in form open at one end and a laterally projecting portion adapted to be connected to a compressed air pipe and having a passageway therein entering said cylindrical portion at its closed end, a screw threaded cap of thin metal engaging external screw threads on the open end of said cylinder and having a thin flat end portion extending across the open end of said cylindrical portion provided with a central opening of such size as to receive within it the end of a tire valve, a washer of uniform thickness composed of an inner portion of rubber and an outer portion of fabric clamped at its margins between the end of said cylindrical portion and the end of said cap and provided with a central opening of less diameter than that in the end of the cap, a metal ball movable longitudinally in said cylindrical portion, the thickness of the washer being such that when the end of the tire valve is in contact with its under surface the valve stem passes through its central opening moving the ball from its seat sufficiently to permit the passage of compressed air.

In testimony whereof I affix my signature.

JOHN P. COLGAN.